(12) United States Patent
Transier et al.

(10) Patent No.: US 7,853,598 B2
(45) Date of Patent: Dec. 14, 2010

(54) COMPRESSED STORAGE OF DOCUMENTS USING INVERTED INDEXES

(75) Inventors: Frederik Transier, Heidelberg (DE); Peter Sanders, Karlsruche (DE)

(73) Assignee: SAP AG, Walldorf (DE)

( * ) Notice: Subject to any disclaimer, the term of this patent is extended or adjusted under 35 U.S.C. 154(b) by 383 days.

(21) Appl. No.: 12/056,856

(22) Filed: Mar. 27, 2008

(65) Prior Publication Data

US 2009/0089256 A1    Apr. 2, 2009

Related U.S. Application Data

(60) Provisional application No. 60/976,683, filed on Oct. 1, 2007.

(51) Int. Cl.
*G06F 17/30* (2006.01)

(52) U.S. Cl. ..................... 707/742
(58) Field of Classification Search ............ 707/3, 707/5, 100, 742; 709/223
See application file for complete search history.

(56) References Cited

U.S. PATENT DOCUMENTS

| | | | | |
|---|---|---|---|---|
| 5,715,195 | A | * | 2/1998 | Smayling et al. ....... 365/185.22 |
| 6,131,082 | A | * | 10/2000 | Hargrave et al. ............... 704/7 |
| 6,532,492 | B1 | * | 3/2003 | Presler-Marshall .......... 709/223 |
| 2008/0126335 | A1 | * | 5/2008 | Gandhi et al. .................. 707/5 |

* cited by examiner

*Primary Examiner*—Etienne P LeRoux
(74) *Attorney, Agent, or Firm*—Buckley, Maschoff & Talwalkar LLC

(57) ABSTRACT

A system may include a provider database, a reader database, and a database management system. The provider database may include a provider data area having a plurality of provider block addresses, and the reader database may include a reader data area having a plurality of reader block addresses, and a mapping of provider-specific identifiers to block addresses of the plurality of provider data pages and of reader-specific identifiers to block addresses of the plurality of reader data pages. The database management system may modify a database object of the reader database, the object being is associated with a provider-specific identifier; and modify the mapping to map the provider-specific identifier to a first block address of one of the plurality of reader data pages.

14 Claims, 2 Drawing Sheets

200

```
┌─────────────────────────────────────────────────┐
│  FOR A COLLECTION OF DOCUMENTS, MAP EACH        │
│  TERM AND EACH DOCUMENT TO AN INTEGER VALUE     │
│  TO OBTAIN DOCUMENT IDENTIFIERS (IDs) AND TERM  │
│     IDENTIFIERS (IDs), RESPECTIVELY             │
│                                         205     │
└─────────────────────────────────────────────────┘
                        │
                        ▼
┌─────────────────────────────────────────────────┐
│     STORE AN INDICATION OF EACH TERM ID IN      │
│     A DOCUMENT-GRAINED INVERTED INDEX           │
│                                         210     │
└─────────────────────────────────────────────────┘
                        │
                        ▼
┌─────────────────────────────────────────────────┐
│   STORE POSITIONAL INFORMATION FOR EACH         │
│   TERM ID IN A SEPARATE DATA STRUCTURE OTHER    │
│   THAN THE DOCUMENT-GRAINED INVERTED INDEX      │
│                                         215     │
└─────────────────────────────────────────────────┘
                        │
                        ▼
┌─────────────────────────────────────────────────┐
│ STORE A (COMPRESSED) LIST OF TERM IDs OF EACH DOCUMENT │
│       WITHOUT DUPLICATES AND WITHOUT            │
│         PRESERVING THE ORIGINAL ODER            │
│                                         220     │
└─────────────────────────────────────────────────┘
                        │
                        ▼
┌─────────────────────────────────────────────────┐
│  RECONSTRUCT A DOCUMENT FROM THE COLLECTION     │
│  OF DOCUMENTS BASED ON THE LIST OF ALL THE TERM │
│  IDs OF EACH DOCUMENT AND THE MAPPED            │
│       TERM IDS AND DOCUMENT IDs                 │
│                                         225     │
└─────────────────────────────────────────────────┘
```

*FIG. 2*

COMPRESSED STORAGE OF DOCUMENTS USING INVERTED INDEXES

FIELD

This disclosure relates to searching in collections of word-based documents. In particular, some embodiments concern in-memory text search engines based on inverted indices.

BACKGROUND

A vital component of many computer applications and systems is the management of text databases, including the storage, searching, and retrieval of text documents. Conventionally, at least a part of an index data structure of a text database is held in main memory while the associated texts are held on disks. Storing and retrieving data from disks limits the speed of text accesses. While RAM (random access memory) continues to increase in capacity, it remains many orders of magnitude more expensive than disks. A number of techniques and approaches have been investigated to efficiently utilize RAM in an effort to migrate towards in-memory databases.

In some instances, various data compression techniques have been explored and developed in an effort to efficiently store and search data stored in RAM.

Data compression techniques may include the use of numerical IDs for documents and for terms in documents such that the IDs are mapped with their documents or terms respectively using dictionaries, the use of lists of numbers to represent addresses of terms in documents such that each number gives the number of term positions to be counted beyond the previous position (initially 0) before reaching the next position of a given term (called difference or delta coding of term positions), Golomb coding using, for example, an optimizable parameter to represent integers compactly.

The foregoing data compression and mapping techniques may provide improvements in some instances for certain types of text database searching. However, methods and systems are desired to facilitate efficient in-memory document searching, retrieval, and reporting.

BRIEF DESCRIPTION OF THE DRAWINGS

FIG. 2 is a flow diagram of a process according to some embodiments herein

DETAILED DESCRIPTION

Figure 1:
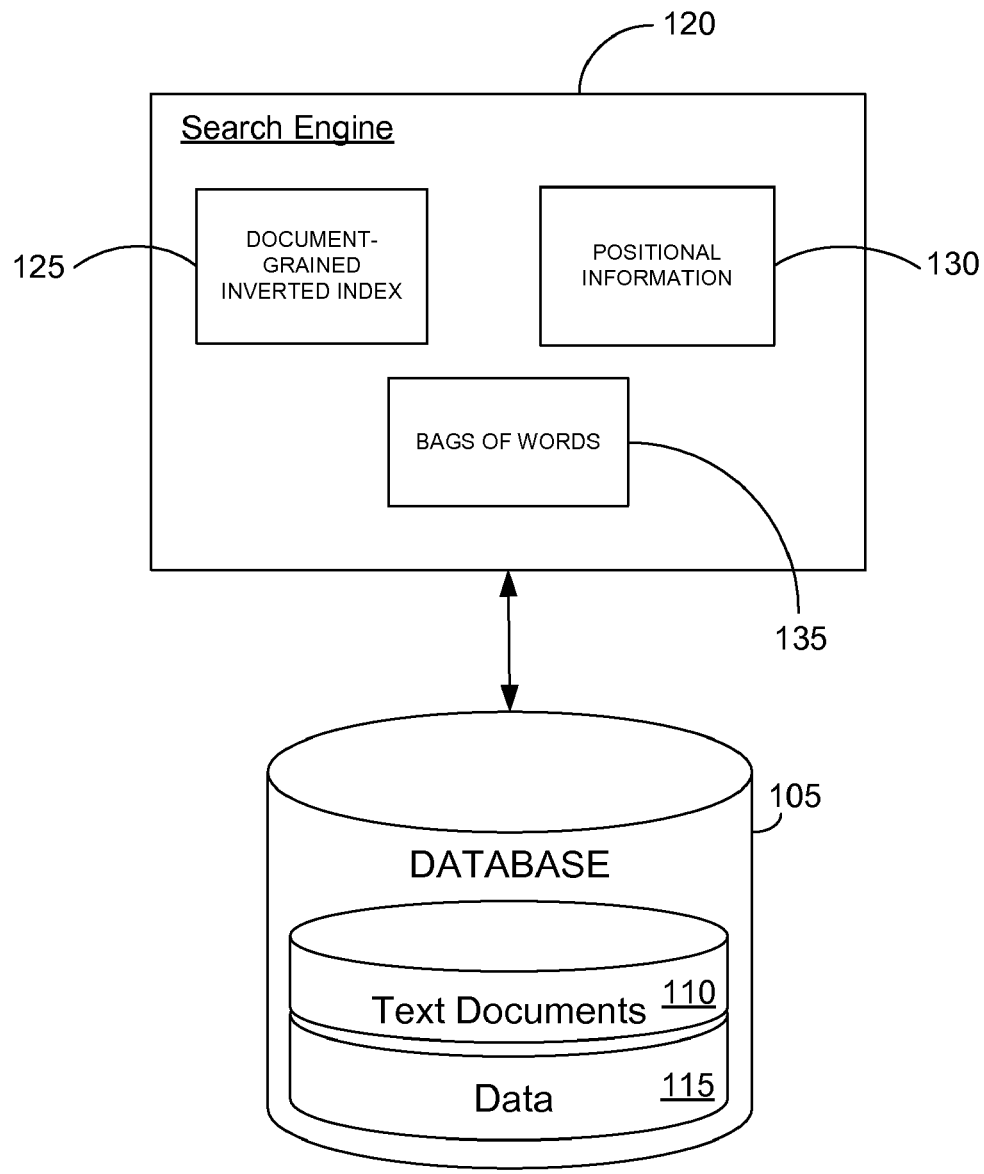
FIG. 1 is a block diagram schematically illustrating aspects of the present disclosure according to some embodiments.

As an introduction of terms used herein and for purposes of clarity and understanding of the present disclosure, a number of terms will now be introduced.

A normalized text document is a set of words or terms obtained from an arbitrary text document source by smoothing out all so-called term separators, e.g., spaces, commas, etc. No distinction is typically made between upper and lower-case characters in the normalized text document. For each document, the lists of smoothed out separators and capitals with their positions may be retained so that they can be reinserted later, if necessary, to reconstitute the original text.

in some embodiments, each term and each document of a collection of documents or a subset of the collection of documents may be mapped to an integer value. The corresponding identifiers are referred to herein as document identifiers (IDS) and term IDs, respectively.

A dictionary maps normalized terms to term IDs and term IDs to normalized terms. In some embodiments, the dictionary may be compressed. The dictionary stores the normalized terms alphabetically ordered and uses a binary search technique for retrieving IDs for a given term.

In the dictionary in some embodiments, all terms are normalized to lower-case characters, the most frequent spelling in English texts. Any differences to this notation in the original document are recorded in a list of term escapes.

As related to text search engines, an inverted index is a list of document IDs for each term ID identifying the documents) in which a term appears. Indexes that contain position information identifying a location or position of a term appearing in a document is referred to as a positional index.

A bag of words is a set of all of the term IDs occurring in a document.

A Boolean AND query of a document collection asks for all documents containing all elements of a given list of query terms. A Boolean OR query searches for all documents that contain any one or more of the terms in a query request.

A phrase query requests documents that contain a given sequence of terms (i.e., a phrase).

Compression techniques may be applied to inverted indexes. There exists a number of compression techniques suitable for compressing inverted lists. In some embodiments, compression techniques using variable bit length encodings may be used to compress inverted indexes. For example, the Golomb encoding compression technique may be used on delta sequences where the Golomb encoding uses a tunable parameter.

FIG. 1 is a schematic diagram illustrating elements of a system 100 including a search engine 120 for selecting documents according to some embodiments herein. System 100 includes an executable search engine 120 for selecting documents from a collection 105 (e.g., a database) including a plurality of text documents 110 and other data 115. Generally, search engine 120 may receive a user request to search and retrieve one or more documents or portions of documents 110 satisfying the query. The request may include a Boolean query, a phrase query, and a request for complete documents from the collection of documents 110.

In some embodiments, search engine 120 includes a document-grained inverted index 125 for storing terms comprising documents 110 and a separate data structure 130 for storing positional information related to the terms in documents 110. In accordance with some embodiments, the document-grained inverted index 125 and the separate data structure 130 stores its data structures and associated data in a main memory of a computing system, apparatus, or device. In some embodiments, document-grained inverted index 125 includes compressed inverted indexes of terms and documents and positional information 130 stores positional information associated with the terms and documents.

In some embodiments, search engine 120 includes a "bag of words" for each indexed document, in addition to the document-grained inverted index 125 and the separate positional information 130 data structures. The bags of words 135 include a "bag of words" for each document that lists all of the different terms that appear in the document. The bags of words 135 may be used to assist in a fast reconstruction of documents from indexes by indicating for which terms the positional information is to be read.

The combination of the document-grained inverted index 125 and the positional information 130 stored in main memory provides a method, system, and mechanism to quickly search, retrieve, and reconstruct requested documents 110 without having to access disk 105 holding the documents.

Search engine 120 may be implemented using any suitable software, hardware or firmware that is or becomes known. In some embodiments, system 100 includes a hardware server, with executable search engine 120 comprising program instructions or code executed by one or more processors of the hardware server and database 105 residing on a hard disk coupled to the hardware server. Two or more of the elements of system 100 may be located remote from one another and may communicate with one another via a computer network and/or a dedicated connection.

FIG. 2 is a flow diagram of a process 200, according to some embodiments herein. In some embodiments, a device, system, processor, and a server may execute program instructions to perform process 200. Process 200 and all other processes mentioned herein may be embodied in processor-executable program instructions read from one or more of a computer-readable medium, such as a floppy disk, a CD-ROM, a DVD-ROM, a thumb drive, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The process depicted in FIG. 2 (and other processes described herein) does not imply a fixed order to the process steps or operations, and embodiments of the present disclosure may be performed in any order that is practicable.

As introduced in FIG. 1, search engine 120 includes a document grained inverted index 125. Operation 205 maps each term and each document to an integer value to obtain term IDs and document IDs, respectively. Each of the term IDs and document IDs are stored in main memory In some embodiments, the documents are normalized before or in conjunction with the mapping process of operation 205. For each term ID, either a pointer to an inverted list is stored or simply a document ID is stored. In the instance the term occurs in only one single document, then the corresponding documents ID is stored. Otherwise, a pointer to an inverted list is stored.

Furthermore, inverted lists herein may be organized and configured in various manners to facilitate efficient searching of the indexes. For example, a long inverted list may be supplemented with a short list of pointers to places in the long list to avoid having to read the entire long list up to a given point of interest. The short list of pointers may be optimized depending on a number of factors, including but not limited to, system resources, types of documents being indexed, etc.

In some embodiments, the inverted index may comprise a two-level lookup data structure. For example, a long list may be organized as a two-level data structure where the top level is a list of pointers and the bottom level is a list of buckets, wherein each pointer points to a bucket. In some embodiments, the pointers may be addressed, to enable a search to go straight to the bucket of interest.

Referring again to FIG. 2, operation 210 depicts each term ID being stored in a document-grained inverted index.

Positional information of each term is stored in a separate data structure (e.g, positional information 130). As shown at operation 215 of FIG. 2, the positional information for each term ID is stored in a separate data structure than the document-grained inverted index. In accordance with the present disclosure, the positional information for each term ID is also stored in main memory.

In some embodiments, the positional data may be stored based on list lengths, a vector indexed by the term IDs provides the basis for the storage of the positional information. For example, for all terms that occur only once within the index, the single position itself is stored. For the remaining terms pointers to lists of different types are stored. Simple linear encoded lists may be used for terms that occur more than once but in just one single document. Terms that appear in multiple documents just once in each, may be stored in a random accessible list. For all the other remaining terms, indexed lists may be used. The indexed list may be a two-level data structure whose top-level points to buckets in the bottom level containing an arbitrary number of values each. Here, a bucket contains a list of positions of the term within a certain document.

in some embodiments, memory management techniques may be used to further achieve space consumption goals. In some embodiments, most data is stored in blocks of, for example, 512 Kbytes each. Lists that are greater than such a block size get their own contiguous memory snippet. Within the blocks, word aligned allocation of different objects may be used.

In some embodiments, a phrase search algorithm based on the modular index herein may be divided into four steps. First, the phrase terms may be sorted according to their frequency, i.e. their inverted list lengths. The term positions within the phrase should also be monitored. Secondly, an intersection of the document-grained inverted lists of the two least frequent terms—using an algorithm lookup if applicable, may be used to keep track of the current rank for each list. As a result, two lists of pairs including a document and the position within the document are obtained. In a third step, the two lists are combined using a binary merge algorithm that normalizes the positions according to the query phrase on-the-fly. In the fourth step, the further terms have to be incorporated into the result set. In increasing order of frequency, the following operations are repeated for each term. In a first step, an intersection operation is performed on a terms inverted list with the current result set. Then, the positions are retrieved. Finally, these results are merged with the previous result set.

The query result of the inverted index is a list of document IDs that are associated with pointers to the original documents. Traditionally, the documents were stored in a separate storage location, i.e. in files on disk or on a networked storage device and retrieved from the disks there when the search engine returns the results. However, since embodiments herein exploit associated advantages of main memory and storage space is scarce, some embodiments use the information about the indexed documents already stored. The term ID—document ID mappings (i.e., ID pairs) are known from the inverted lists, as well as the position lists for these ID pairs. Accordingly, the sequence of normalized terms of a document may be restored by traversing the inverted lists, gathering the term IDs and placing their dictionary items.

However, a more efficient process may be used in accordance with the present disclosure. A "bag of words" may be stored for each document in addition to the data structures of the embodiments herein. The "bag of words" includes a set of all the term IDs occurring in a document. The bags of words are stored at operation 220. As illustrated, a list of the term IDs of each document is stored without duplicates and without preserving the original order of the terms. In some embodiments, the bag of words for each document may be compressed. The bag of words may be stored sorted in increasing order of IDs using, for example, delta Golomb encoding. In this manner, some embodiments can build term sequences without traversing through all inverted lists by positioning all terms of the bag. In accordance with the present disclosure, the bags of words 135 are also stored in main memory.

in order to reconstruct the original document from the sequence of normalized terms at operation 225, changes made to the terms of the original documents are stored during the normalization process. An item in the term escapes list includes a pair of a position where the variation in the sequence occurs and an escape value. The escape value indicates how the term has to be modified. For example, a value of 0 means that the first character has to be capitalized and a value of 1 means that the whole term has to be spelled with capital letters. Each greater escape value may point to a replacement term in a separate escape dictionary.

In some embodiments, it remains to incorporate the term separators into the sequence of adjusted terms to reconstruct the original document. The term separators may be mapped to IDs as well, stored in a list of separator IDs for each document along with an additional indicator bit. The bit may specify whether the document has to be continued with a term or with another separator. In some instances, a binary merge algorithm may be used to reconstruct the original document from the term sequence and the separators series.

The embodiments described herein are solely for the purpose of illustration. Those in the art will recognize other embodiments may be practiced with modifications and alterations limited only by the claims.

What is claimed is:

1. A method comprising:
mapping, for a collection of documents, each term and each document to an integer value to obtain term identifiers (IDs) and document identifiers (IDs), respectively, the mapping of the term IDs and the document IDs performed based on a frequency each term occurs in the collection of documents;
storing, in a main memory of a computing system, an indication of an occurrence of each term ID in the collection of documents in a document-grained inverted index for terms occurring in multiple documents of the collection of documents, and for each document-grained inverted index exceeding a threshold length storing the indication of the occurrence of each term ID in the collection of documents in a two-level data structure;
storing, in the main memory of the computing system, positional information for each term ID in a separate data structure other than the document-grained inverted index, the positional information for each term ID stored based on a frequency each term occurs in the collection of documents and the number of different documents corresponding to those occurrences;
determining a list of all the term IDs of each document;
storing the list of all the term IDs, in the main memory of the computing system, without duplicates and without preserving an original order of the terms; and
reconstructing a document from the collection of documents based on the list of all the term IDs of each document and the mapped term IDs and document IDs stored in the main memory of the computer system.

2. The method of claim 1, wherein the mapping of the term IDs and document IDs are stored as term ID and document ID pairs.

3. The method of claim 1, further comprising responding to least one of a term query and a phrase query regarding the collection of documents.

4. The method of claim 1, wherein the list of all the term IDs of each document is compressed.

5. The method of claim 1, further comprising normalizing each document in the collection of documents.

6. The method of claim 5, wherein the reconstructing of the document comprises correcting changes due to the normalizing of each of the documents in the collection of documents.

7. The method of claim 5, wherein the reconstructing of the document comprises incorporating term separators into the reconstructed document.

8. A medium storing processor-executable instructions, the medium comprising:
instructions to map, for a collection of documents, each term and each document to an integer value to obtain term identifiers (IDs) and document identifiers (IDs), respectively, the mapping of the term IDs and the document IDs performed based on a frequency each term occurs in the collection of documents;
instructions to store, in a main memory of a computing system, an indication of an occurrence of each term ID in the collection of documents in a document-grained inverted index for terms occurring in multiple documents of the collection of documents, and for each document-grained inverted index exceeding a threshold length storing the indication of the occurrence of each term ID in the collection of documents in a two-level data structure;
instructions to store, in the main memory of the computing system, positional information for each term ID in a separate data structure other than the document-grained inverted index, the positional information for each term ID stored based on a frequency each term occurs in the collection of documents and the number of different documents corresponding to those occurrences;
instructions to determine a list of all the term IDs of each document;
instructions to store the list of all the term IDs, in the main memory of the computing system, without duplicates and without preserving an original order of the terms; and
instructions to reconstruct a document from the collection of documents based on the list of all the term IDs of each document and the mapped term IDs and document IDs stored in the main memory of the computer system.

9. The medium of claim 8, further comprising instructions to map and store the term IDs and document IDs as term ID and document ID pairs.

10. The medium of claim 8, further comprising instructions to compress the list of all the term IDs of each document.

11. The medium of claim 8, further comprising instructions to normalize each document in the collection of documents.

12. The medium of claim 11, further comprising instructions to correct changes due to the normalizing of each of the documents in the collection of documents.

13. The medium of claim 11, further comprising instructions to incorporate term separators into the reconstructed document.

14. The medium of claim 8, wherein the positional information for each term ID is stored in the separate data structure based on list lengths associated with each term ID.

* * * * *